March 21, 1961 J. M. GWINN, JR., ET AL 2,975,913
REFUSE LOADER CONTROL MECHANISM
Filed Jan. 22, 1957 7 Sheets-Sheet 1
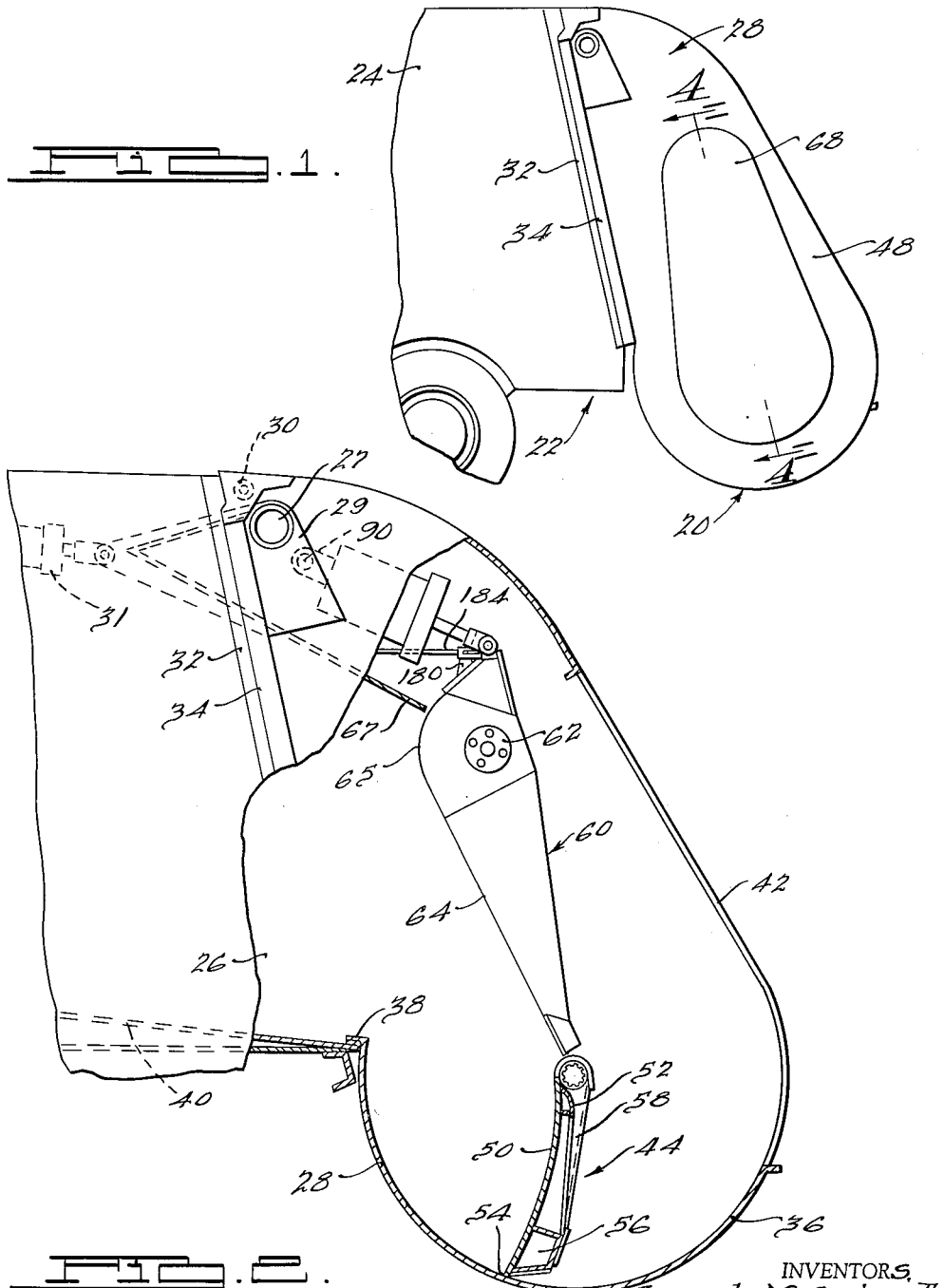
INVENTORS,
Joseph M. Gwinn, Jr.
Angus J. O'Brien,
Gerald W. Coleman,
BY
Harness, Dickey & Pierce.
ATTORNEYS.

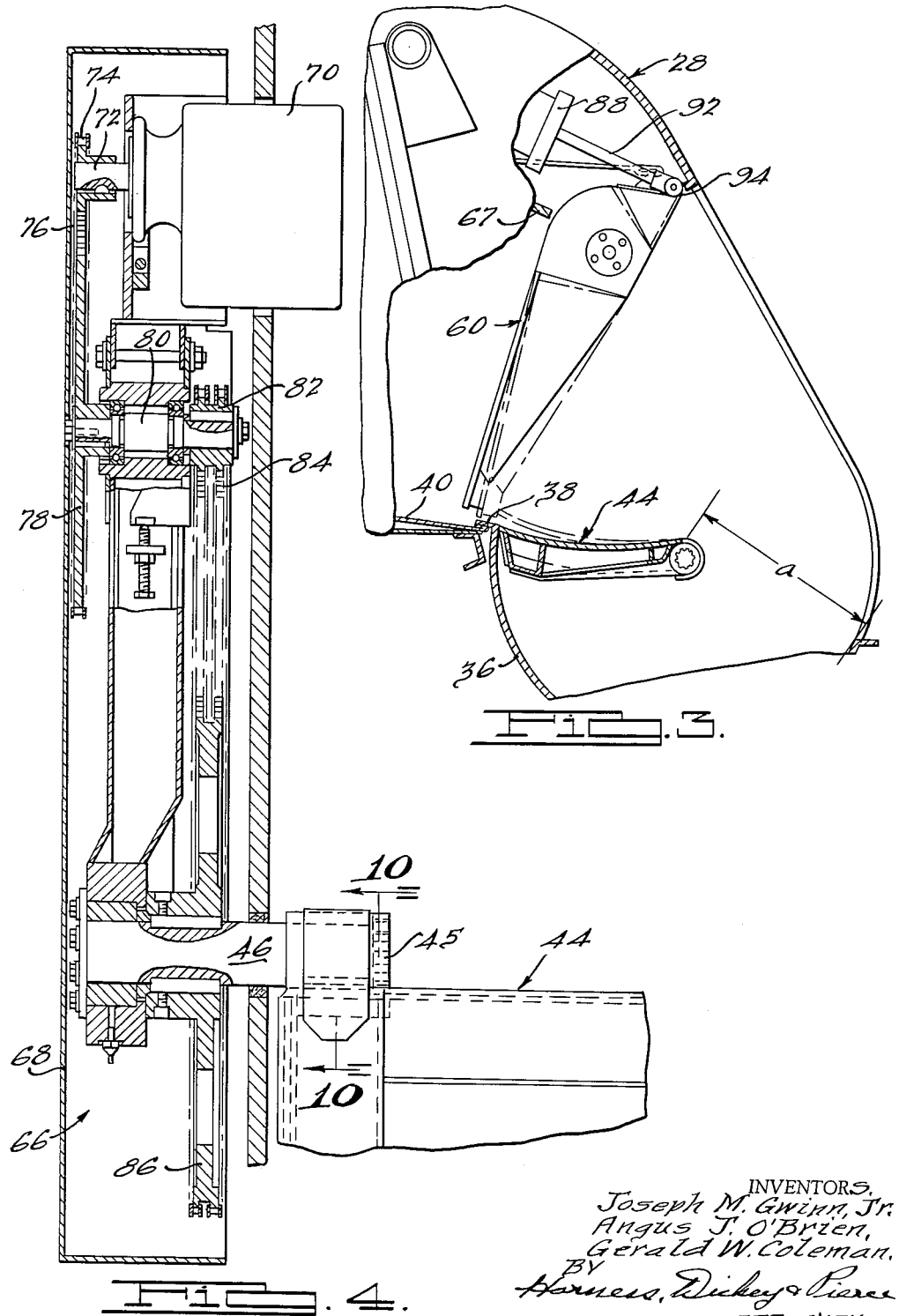

March 21, 1961 J. M. GWINN, JR., ET AL 2,975,913
REFUSE LOADER CONTROL MECHANISM
Filed Jan. 22, 1957 7 Sheets-Sheet 3
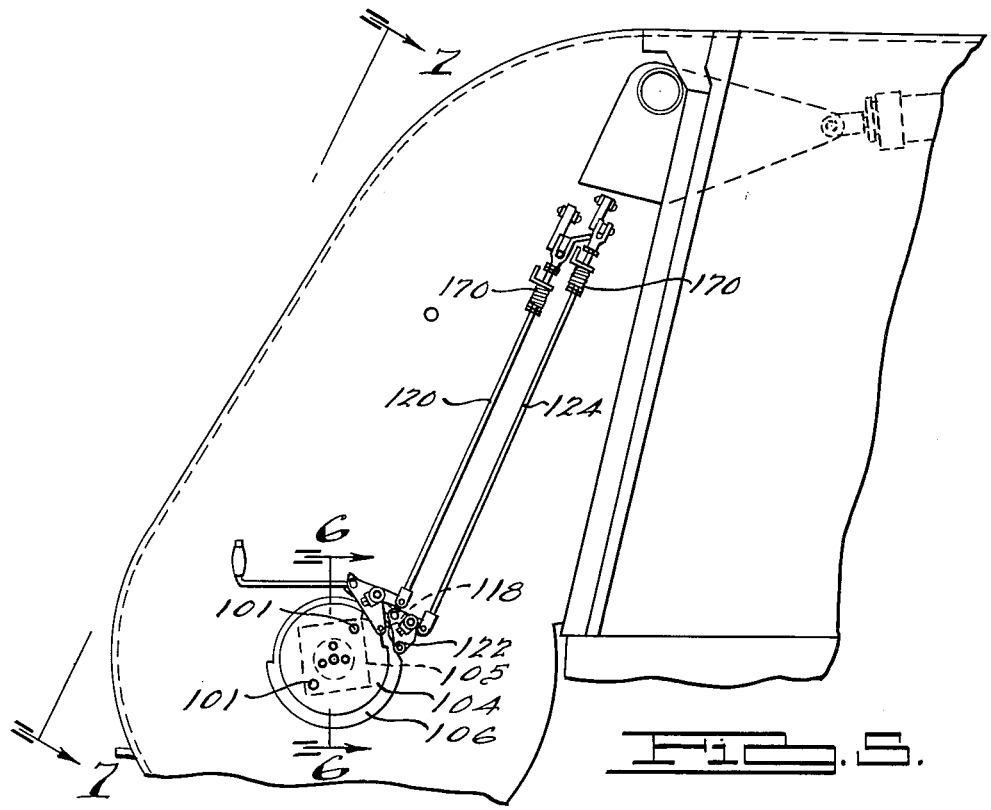
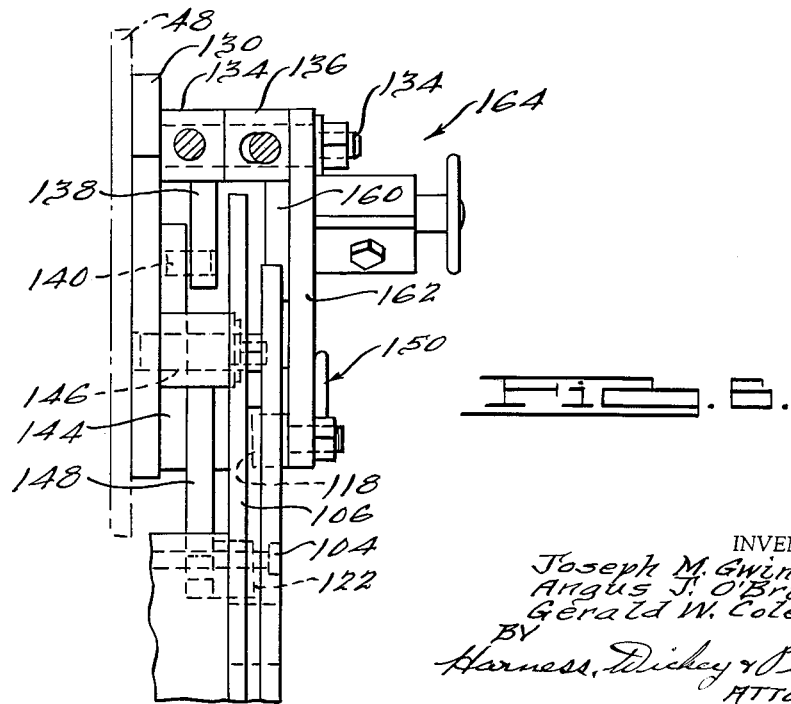
INVENTORS.
Joseph M. Gwinn, Jr.
Angus J. O'Brien,
Gerald W. Coleman,
BY
Harness, Dickey & Pierce
ATTORNEYS.

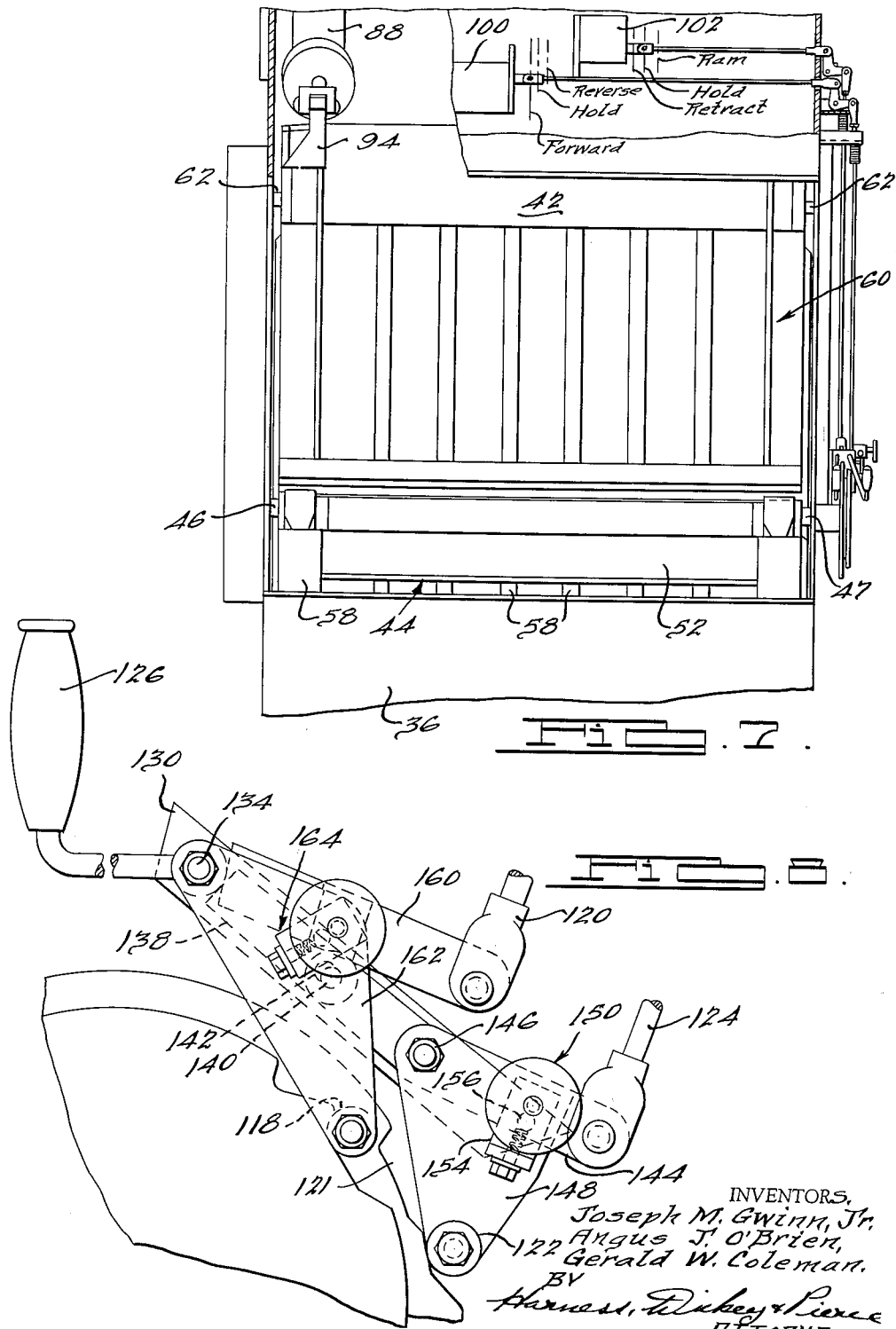

March 21, 1961  J. M. GWINN, JR., ET AL  2,975,913
REFUSE LOADER CONTROL MECHANISM
Filed Jan. 22, 1957  7 Sheets-Sheet 5

INVENTORS.
Joseph M. Gwinn, Jr.
Angus J. O'Brien,
Gerald W. Coleman.
BY
Harness, Dickey & Pierce
ATTORNEYS.

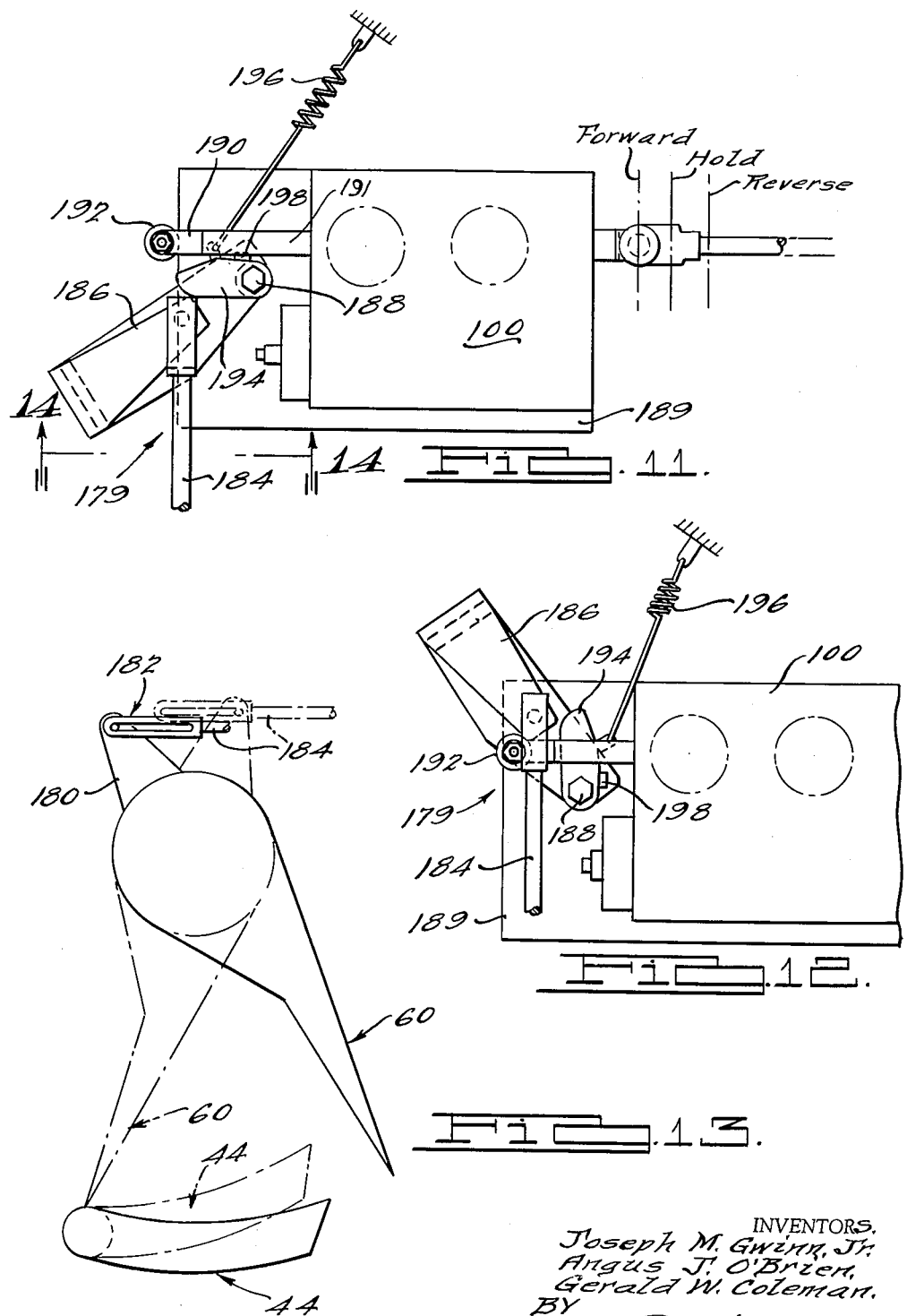

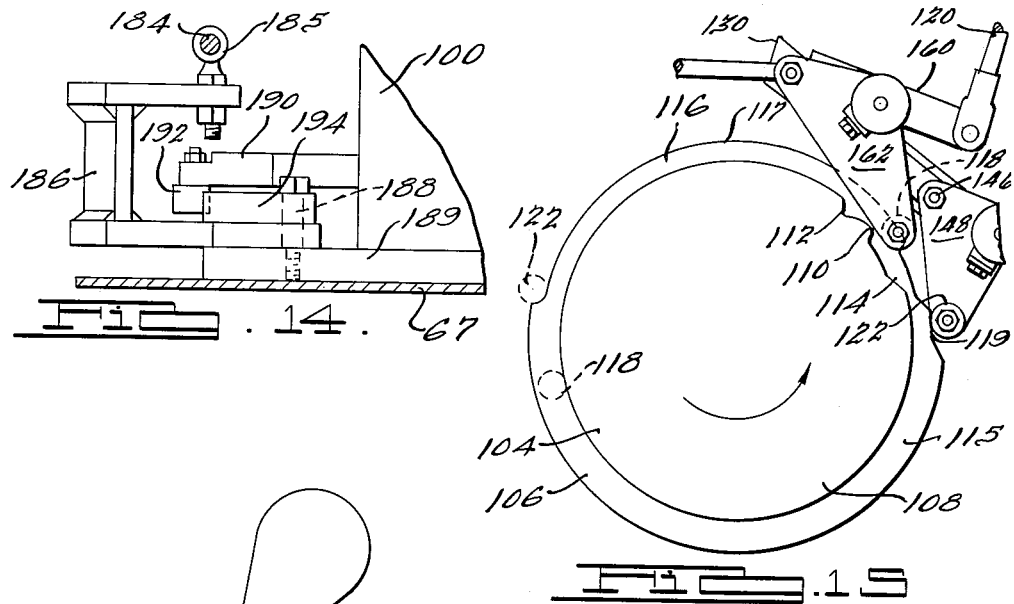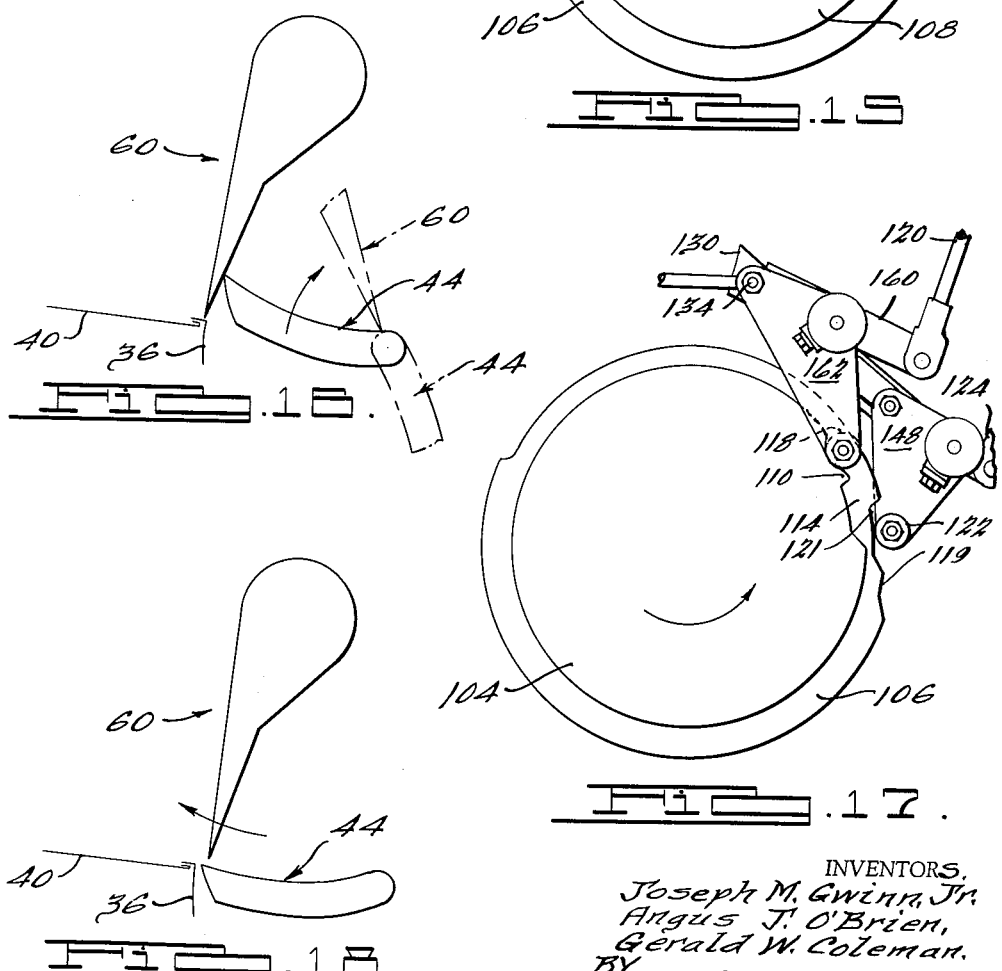

United States Patent Office 2,975,913
Patented Mar. 21, 1961

2,975,913

REFUSE LOADER CONTROL MECHANISM

Joseph M. Gwinn, Jr., Dearborn, Angus J. O'Brien, Birmingham, and Gerald W. Coleman, Detroit, Mich., assignors to Gar Wood Industries, Inc., a corporation of Michigan Filed Jan. 22, 1957, Ser. No. 635,487

11 Claims. (Cl. 214—83.3)

This invention relates generally to refuse loaders and more particularly to a control mechanism for refuse loaders of the continuous loading type disclosed in Lee Patent 2,335,155.

In the continuous loading type of truck mounted refuse loader illustrated in the Lee Patent refuse is continuously supplied to the loader which then operates by means of a pair of refuse handling panels, one of which rotates through a complete circle of three hundred and sixty degrees, to transfer the refuse to a storage compartment mounted adjacent the loader. The refuse is transferred by the panels one charge at a time to the compartment which is of a size to receive a multitude of charges. The loader operates to compress these charges of refuse into the compartment so that a minimum of dumping trips for the truck are required.

An object of this invention is to provide an improved control mechanism which provides for an automatic operation of a loader of the above type.

A further object of this invention is to provide a refuse loader control mechanism which requires no manual attention other than to initiate each loading cycle for transferring a refuse charge.

A further object of this invention is to provide a refuse loader control mechanism which is relatively simple in construction, economical to manufacture, and efficient in operation in providing for trouble-free operation of a refuse loader in a predetermined manner.

Further objects, features and advantages of this invention will become apparent from a consideration of the following description, the appended claims and the accompanying drawing in which:

Fig. 1 is a fragmentary foreshortened elevational view of a refuse collector having a loader provided with the control of this invention;

Fig. 2 is an enlarged elevational view of a portion of the apparatus shown in Fig. 1, with some parts broken away and other parts shown in section for the purpose of clarity and illustrating one position of the refuse handling panels in the apparatus;

Fig. 3 is a side elevational view, illustrated similarly to Fig. 2 showing another position of the refuse handling panels;

Fig. 4 is a fragmentary enlarged sectional view looking substantially along the lines 4—4 in Fig. 1;

Fig. 5 is a fragmentary elevational view of the loader illustrated in Fig. 1 showing a portion of the control mechanism of this invention in assembly relation therewith;

Fig. 6 is an enlarged sectional view looking substantially along the lines 6—6 in Fig. 5;

Fig. 7 is an elevational view looking substantially along the lines 7—7 in Fig. 5;

Fig. 8 is an enlarged elevational view of a position of the control mechanism of this invention;

Figs. 11 and 12 are plan views illustrating the trigger mechanism which forms a part of the control mechanism of this invention, and illustrating changed positions of the trigger mechanism;

Fig. 13 is a diagrammatic side view of the loader ram panel and a link which connects the panel with the trigger mechanism illustrated in Figs. 11 and 12;

Fig. 14 is a sectional view looking substantially along the lines 14—14 in Fig. 11;

Fig. 15 is a diagrammatic view illustrating one position of the cams and the followers associated therewith in the control mechanism of this invention;

Fig. 16 is a diagrammatic view illustrating the positions of the panels corresponding to the cam positions illustrated in Fig. 15;

Fig. 17 is a diagrammatic view illustrated similarly to Fig. 15 and showing another position of the control cams and followers; and Fig. 18 is a diagrammatic view illustrating the positions of the panels corresponding to the cam positions illustrated in Fig. 17.

Figure 9:
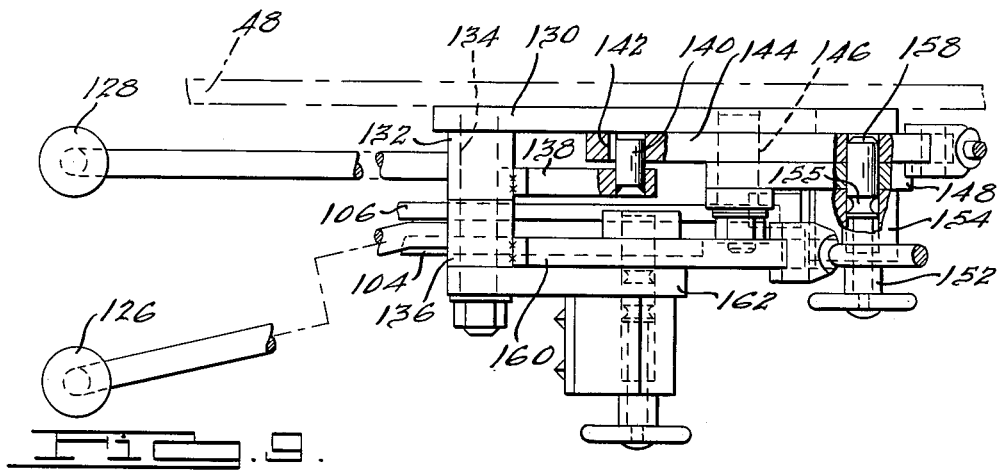
Fig. 9 is a top view of a portion of the control mechanism illustrated in Fig. 8.
Figure 10:
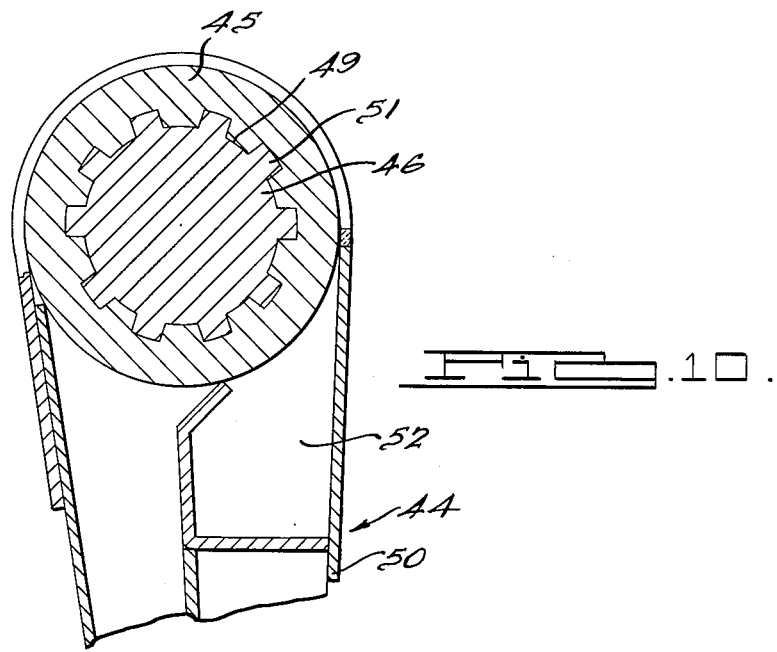
Fig. 10 is a fragmentary sectional view looking along the lines 10—10 in Fig. 4.

With reference to the drawing, the control mechanism of this invention is shown applied to a refuse loader, indicated generally at 20 in Fig. 1 mounted on the rear end of a truck 22. The truck 22 is of conventional type having a body 24 for enclosing a storage compartment 26 and is used in the usual manner for making house to house pick-ups of garbage and other refuse. A compressing of this refuse into the storage compartment 26 is accomplished with the loader 20 which is described and claimed in a copending application of Joseph M. Gwinn, Jr., Serial No. 635,488, filed January 22, 1957, and assigned to applicant's assignee now Patent No. 2,879,906.

The loader 20 includes a hollow tailgate structure 28 located at the rear end 32 of the body 24 which is open for receiving refuse from the loader 20. A torque tube 27 extends transversely across the upper end of the tailgate 28 and is pivotally connected at 30 to the body rear end 32. A pair of plates 29 are secured to opposite ends of the torque tube 27 and connected to hydraulic cylinder assemblies 31 on the body 24 so that on actuation of the assemblies 31, the tailgate 28 can be swung upwardly and rearwardly about the pivots 30 for opening the rear end of the body for dumping refuse therefrom. A lift mechanism (not shown) is actuated to provide for a tilting of the body 24 to dump the refuse therefrom. In the loading position of the loader 20 illustrated in Fig. 1, the front end 34 of the tailgate 28 is in a fluid tight relation with the rear end 32 of the body 24 to prevent leakage of refuse from the compartment 26.

The tailgate 28 has a trough or hopper portion 36 at its lower end which extends transversely of the body 24 and is generally semi-circular in cross section. A lip 38 on the front end of the trough portion 36 fits within the rear end of the body 24 in the loading position of the tailgate 28 to facilitate a travel of refuse from the trough 36 onto the upwardly inclined rear end portion 40 of the floor of the compartment 26. Immediately above the trough 36 the tailgate 28 is provided with an opening 42 (Figs. 2 and 7) through which refuse is dumped into the trough 36 for transfer to the compartment 26.

The refuse handling panels

A sweep or conveyor panel or member 44 extends longitudinally of the trough 36 and carries stub shafts 46 and 47 at its opposite ends which are supported in the end walls 48 of the tailgate 28. The sweep panel 44 includes a continuous, slightly concave, plate member 50 provided adjacent its inner end with a first stiffener beam 52 and adjacent its outer or terminal end 54 with a second stiffener beam 56. The beams 52 and 56 extend longitudinally of the plate 50 and a plurality of spaced reinforcing ribs 58 extend transversely of the plate 50 for insuring a panel of the required strength. The stub shafts 46 and 47 are located at the center of curvature of the trough 36 and the plate 50 is of a length such that the outer end terminates adjacent the wall of the trough 36 so that on rotation, the panel 44 sweeps refuse from the trough 36.

At its ends the panel 44 includes a pair of shaft connection housings 45, only one of which appears in Fig. 4, arranged in an offset relation with the beam 52. Each housing 45 is provided with internal spline teeth 49 adapted to mesh with external spline teeth 51 on the corresponding shaft 46 or 47.

By virtue of this construction of the panel 44 with the beams 52 and 56, and particularly the beam 56 since it accomplishes the major part of the strengthening of the plate 50 against longitudinal bending, the requirement for a continuous supporting shaft at the inner end of the panel is avoided and only the stub shafts 46 and 47 are required. In other words, the beams 52 and 56 act to stiffen the plate 50 in a direction longitudinally thereof so that a continuous supporting shaft is avoided. As a result, a larger trough intake opening, defined by the distance indicated at "a" in Fig. 3 between the outer side of the trough 36 and the inner end of the plate 50, is provided. An enlargement of the opening "a" equal to approximately the diameter of the shaft which is ordinarily required is achieved by virtue of the construction of the panel 44 for support on the stub shafts 46 and 47.

Mounted above the sweep panel 44 is a ram panel or member 60 supported on stub shafts 62 carried in the end walls 48 of the tailgate 28. The panel 60 includes a front refuse engaging plate 64 having a curved upper portion 65 arranged in a closely spaced relation with a partition 67 which is carried by and extends between the tailgate end walls 48. The partition 67 extends upwardly and forwardly from the plate portion 65 to a position within the compartment 26 and then rearwardly and upwardly to a position engaging the torque tube 27. The packer panel 60 is movable back and forth about the shafts 62 between the downwardly and rearwardly inclined retracted position illustrated in Fig. 2 and the downwardly and forwardly inclined ram position illustrated in Fig. 3. During movement of the panel 60 from the retracted to the ram position, the plate 64 operates to compress and move refuse into the compartment 26.

*The panel operating mechanism*

A drive assembly, indicated generally at 66 (Fig. 4), for the sweep panel 44 is carried in a housing 68 mounted on one of the end walls 48 for the tailgate 28. The drive assembly 66 includes a hydraulic motor 70 provided with a drive shaft 72 which carries a sprocket 74. A chain 76 trained about the sprocket 74 is also trained about a larger sprocket 78 carried on a shaft 80 which is provided also with a smaller sprocket 82. A chain 84 trained about the sprocket 82 is also trained about a larger sprocket 86 which is secured to the stub shaft 46 at one end of the sweep panel 44.

Thus, on operation of the hydraulic motor 70, the sweep panel 44 is rotatable in a clockwise direction as viewed in Fig. 2 to sweep refuse from the trough 36 to a position in which the ram panel 60 can operate on the refuse to move it into the compartment 26.

A pair of hydraulic cylinder assemblies 88 are pivotally supported at their inner ends on pins 90 carried by the plate 29 on the tailgate 28 and are provided with outwardly extended piston rods 92 attached to corresponding upwardly extending ears 94 provided at the ends of the panel 60. On extension of the piston rods 92, which operate in unison, the panel 60 is rotated in a clockwise direction from the retracted position (Fig. 2) to the ram position illustrated in Fig. 3. Conversely, on retraction of the piston rods 92, the panel 60 is rotated in a reverse direction. The position of the panel 60 illustrated in dotted lines in Fig. 3 which is between the ram and retracted positions is termed a leak position and is due to the pressure of the compressed refuse on the ram panel 60 when in its ram or compressing position. The pressure of refuse in the compartment 26 and the fact that the cylinder assemblies 88 usually leak somewhat combine to provide for movement of the panel 60 to the leak position when an attempt is made to maintain the compressing panel 60 in the ram position for a prolonged period when the compartment 26 is substantially full of compressed refuse.

Mounted on the downwardly and rearwardly extended portion of the partition 67, which blocks any upward travel of refuse in the tailgate 28, are a pair of control valves 100 and 102 for the sweep and ram panels 44 and 60, respectively.

The valves 100 and 102 are preferably connected to a pair of corresponding pumps (not shown) associated with a fluid reservoir so that the available supply of fluid to one of the valves is not affected by the supply of fluid to the other valve. As a result, each of the panels 40 and 66 is operable entirely independently of the other panel. However, it is to be understood that a single pump may be associated with the valves 100 and 102 in a manner to achieve the same result so that the panel operating mechanism is not limited to use with only two pumps.

As illustrated in Figs. 7 and 11, the control valve 100 for the sweep panel 44 has three control positions corresponding to "forward," "hold" and "reverse" movements of the sweep panel 44. In the "forward" position of the control valve 100, fluid under pressure is supplied to the motor 70 to provide for clockwise rotation of the panel 44 as viewed in Fig. 2. On movement of the valve 100 to a "hold" position, the valve acts to lock fluid in the motor 70 so that the sweep panel 44 is held in a stationary position. On movement of the valve 100 to the final "reverse" position, the fluid is supplied to the motor 70 such that the panel 44 is moved in a reverse direction, namely, counterclockwise as viewed in Fig. 2.

The valve 102 is likewise provided with three control positions corresponding to "retract," "hold" and ram or compressing movements of the packer panel 60. In the "retract" position of the valve 102, fluid is supplied to the cylinder assemblies 88 to retract the piston rods 92 and move the panel 60 in a counterclockwise direction. On movement to the "hold" position, the valve 102 acts to lock fluid in the hydraulic cylinder assemblies so that the panel 60 is maintained in a predetermined position. On movement of the valve 102 to the compressing position, the piston rods 92 are extended and the panel 60 is moved in a compressing direction, namely, forwardly of the body 24.

Fixed on the stub shaft 47 on the side of the tailgate 28 opposite the housing 68 are a pair of control cams 104 and 106 (Fig. 5) corresponding to the control valves 100 and 102, respectively. A pair of pins 101 lock the cams 104 and 106 together on opposite sides of a spacer plate 105.

As best appears in Figs. 15 and 17, the cam 104 which actuates the sweep panel control valve 100 has a first large lobe 108 which constitutes almost the entire cam. A second smaller lobe 110 is separated from the lobe 108 on one side by a first small notch 112 and on the other side by a larger notch 114, with the notches 112 and 114 being of equal depth.

The cam 106 which actuates the ram panel control valve 102 is larger than the cam 104 and has a first large lobe 115 extended over substantially half the peripheral length of the cam 106. A second smaller diameter lobe 116 has a long portion 117 and a shorter portion 119 separated by a notch 121. The reasons for these specific cam shapes will become apparent from the hereinafter described operation of the loader 20.

A cam follower 118 cooperates with the cam 104 and a linkage 120 to control the position of the valve 100 in response to the position of the follower 118 on the cam 104. A similar follower 122 on the cam 106 cooperates with a linkage 124 connected to the control valve 102.

A pair of spring 170 incorporated in the linkages 120 and 124 normally maintain the followers 118 and 122 against their respective cams 104 and 106.

The followers 118 and 122 and a pair of manual control handles 126 and 128 corresponding thereto are carried on a plate 130 (Figs. 6, 8 and 9) secured to the adjacent end wall 48 of the tailgate 28. The handle 128 is secured to a first sleeve 132 carried on a bolt 134 projected outwardly from the plate 130. The handle 126 is similarly secured to a sleeve 136 arranged on the bolt 134 outwardly of the sleeve 132. An arm 138 secured to the sleeve 132 carries a pin 140 received in a slot 142 in one end of a lever 144 which is pivoted intermediate its ends on a bolt or pivot 146 carried by the plate 130. The opposite end of the lever 144 is connected to the linkage 124.

A triangular plate 148 carries a cam follower 122 at one of its corners, is pivotally supported on the pin 146 at a second corner and is releasably locked to the lever 144 by a locking unit 150 at its third corner. The unit 150 includes a pin 152 slidably supported in a housing 154 mounted on the triangular plate 148. A spring pressed ball 156 in the housing 154 is movable into an annular groove 155 in the pin to releasably lock the pin in a position projecting into an opening 158 in the lever 144 so that the plate and lever are locked together. The pin 152 is pulled out of the opening 158 against the action of the spring pressed ball 156 to unlock the plate and lever.

As a result, when the pin 152 is retracted from its position extended into the lever 144, the handle 128 is movable downwardly to in turn move the linkage 124 downwardly without moving the cam follower 122. The valve 102 is thus subject to manual actuation to control the ram panel 60. Separation of the plate 48 and the lever is required since without such separation the follower 122 may prevent downward movement of the linkage 124, depending on the position of the cam 106.

The sleeve 136 for the handle 126 is similarly secured to one end of an arm 160, the opposite end of which is secured to the linkage 120. A triangular plate 162 carries the follower 118 at one corner, is pivotally supported on the bolt 134 at a second corner and carries a locking unit 164 at its third corner for releasably locking the arm 160 and the plate 162 together. As a result, the handle 126 may likewise be moved to in turn actuate the linkage 120 without interference from the follower 118 engaging the cam 104.

Operation

In the operation of the loader 20, first assume that refuse has been supplied by the pick-up men to the trough 36 in the usual manner, that the sweep panel 44 is in the dotted line position illustrated in Fig. 3, and that the ram panel 60 is in either of the positions shown in Fig. 3 depending on the extent to which refuse has been compressed in the compartment 26. As will hereinafter more clearly appear, such positions are the normal rest positions of the panels. To initiate panel operation, the operator manually moves the handle 126 down to lift the follower 118 out of the cam notch 114, which is of a depth such that when the follower 118 is in the notch 114 the valve 100 is in a "hold" position. The follower 118 is lifted to a position (Fig. 15) corresponding to the "forward" position of the control valve 100. The motor 70 is then supplied with fluid under pressure so that the motor operates to rotate the panel 44 in a clockwise direction as viewed in Figs. 2 and 3. Since the cams 104 and 106 are secured to the panel 44 for concurrent rotation therewith, the cams rotate in a counterclockwise direction as viewed in Figs. 15 and 17 so that the follower 118 is quickly positioned opposite the large lobe 108. The handle 126 is then released so that the follower 118 rides on the lobe 108 which is of a size to maintain the valve 100 in the "forward" position.

Since the cam 106 rotates concurrently with the sweep panel 44, as soon as the sweep panel 44 begins to rotate, the cam 106 rotates to lift the follower 122 off the portion 119 of the lobe 116, in which position the valve 102 is in the "hold" position, onto the large lobe 115 which moves the valve 102 to the "retract" position.

It is seen, therefore, that the panel 44 rotates in a sweeping direction relative to the trough 36 concurrently with a movement of the ram panel 60 in a retracting direction, with the rate of movement of the panels providing for a continuous location of the panel 44 behind the panel 60 to avoid any unnecessary contact of the panels.

On movement of the follower 122 off the lobe 115 onto the portion 117 of the lobe 116, to move the ram panel control valve 102 back to a "hold" position, the ram panel 60 has been moved to a fully retracted position as shown in dotted lines in Figs. 15 and 16. The sweep panel 44 continues rotating in a sweeping direction so that refuse in the trough 36 is moved ahead of the panel 44 toward the compartment 26.

This sweeping action of the panel 44 continues until the follower 118 drops into the notch 112 to return the control valve 100 to a "hold" position. At this time, the sweep panel 44 has operated to sweep the refuse from the trough 36 to a supported position on the panel 44, which is in a substantially horizontal position. This position of the sweep panel 44, hereinafter termed a "floor position," is illustrated in Fig. 3 in solid lines with the free end of the panel 44 at the level of the lip 38 which rests on the portion 40 of the compartment floor. A pair of conventional one-way latches (not shown) are mounted in the tailgate end walls 48 for preventing reverse rotation of the sweep panel 44 from the floor position. The latches are readily released manually from outside the tailgate 28 in the event reverse rotation of the panel 44 is required.

Concurrently with movement of the follower 118 into the notch 112, to move the control valve 100 to the "hold" position so that rotation of the cams 104 and 106 is discontinued, the follower 122 moves into the notch 121 to in turn move the ram panel control valve 102 to the compressing position. Since rotation of the cams 104 and 106 has been discontinued, the valve 102 remains in the compressing position until movement of the compressing panel 60 in the ram direction has been completed.

It can thus be seen that until rotation of the sweep panel 44 is interrupted, by movement of the follower 118 into the notch 112, rotation of the panel 44 actuates all of the panel control mechanism. In other words, since the control valves for the panels 44 and 60 are controlled by the cams 104 and 106, which are in turn rigidly mounted on the shaft for the sweep panel 44, the entire control mechanism is under the control of the sweep panel 44 which is now in a stationary position.

A trigger mechanism, indicated generally at 179, associated with the sweep panel control valve 100 and the ram panel 60, provides for movement of the sweep panel 44 to the latch position shown in Fig. 16 awaiting further manual initiation of a charging cycle. An upright ear 180 provided intermediate the ends of the ram panel 60 actuates the trigger mechanism 179. The ear 180 is attached by means of a lost motion connection 182 to one end of a link 184, the opposite end of which is connected by means of a universal joint 185 to one end of a C-shaped arm 186 (Figs. 11 and 14).

The opposite end of the arm 186 is supported on a pivot pin 188 projected upwardly from mounting plate 189 secured to the partition 67 at a position adjacent the valve 100. An extension 190 on a control spool 191 for the valve 100 carries a follower 192 for an irregularly shaped cam 194 which is also supported at one of its ends on the pivot 188. A spring 196 connected to the partition 67 is secured to the cam 194 and normally maintains the cam in an engaged position with an upwardly extending projection or stop 198 on the arm 186.

When the ram panel 60 has nearly completed its movement in a compressing direction, the ear 180 operates through the lost motion connection 182 and the link 184 to move the arm 186 counterclockwise as viewed in Fig. 12 to the position shown in Fig. 11. The stop 198 provides for concurrent rotation of the cam 194 which engages the follower 192 to move the spool 191 in a direction toward the "forward" position of the valve 100. The spool is moved sufficiently to leak enough fluid to the motor 70 to provide for a resumption of the rotation of the cam 104 providing for lifting of the cam follower 118 out of the notch 112 onto the lobe 110.

In this position of the follower 118, the valve 100 is in a "forward" position so that rotation of the ram panel 44 is continued until the follower 118 falls into the notch 114. At such time, the panel 44 has been rotated to its latch position (Fig. 16) behind and in the path of the ram panel 60. During movement of the follower 118 between the notches 112 and 114 the cam 106 moves the follower 122 onto the portion 119 of the lobe 116 so that the valve 102 is returned to a "hold" position. The panel 60 is thus stopped in a "forward" position from which it is moved on initiation of the next charging cycle.

In its latch position, the panel 44 positively prevents rearward movement of the panel 60, in response to the pressure thereon of the refuse in the compartment 26 past a position in which the panel 60 acts to close the rear end of the compartment 26. The limited movement illustrated for the panel 60 in response to this refuse pressure is permitted by the leakage of fluid at the cylinder assemblies 88.

It is seen, therefore, that the sweep panel 44 controls automatic operation of the loader until the ram panel movement in a compressing direction is nearly completed at which time the ram panel 60 actuates the trigger mechanism 179 to provide for further movement of the sweep panel 44.

During movement of the ram panel in the "retract" direction, the panel operates through the link 184 to re-set the trigger mechanism 179. During re-setting, the follower 192 clears the cam 194 since at such time the valve 100 is in its "forward" position.

It can thus be seen that during normal operation of the loader 20, a loading cycle is determined by a complete revolution of the cams 104 and 106. In the event any refuse becomes jammed in the tailgate 28 so that the loader will not operate properly, the handles 126 and 128 are operated to selectively rotate the panels 44 and 60 to positions in which the refuse causing the jamming can be removed or rearranged. By virtue of the fixed spaced relation of the followers 118 and 122 and the rigid connections of the cams 104 and 106, the panels 44 and 60 do not have to be returned to their start positions illustrated in Figs. 3 and 16 prior to resuming automatic operation of the loader 20. It is only necessary to initiate automatic operation to provide for re-setting of the panels at their start positions.

Although the invention has been described with respect to a preferred embodiment thereof, it is to be understood that it is not to be so limited, since changes can be made therein which are within the scope of the invention as defined by the appended claims.

What is claimed is:

1. In a refuse collector which includes a storage compartment for receiving refuse, a refuse receiving trough positioned adjacent one side of said compartment, apparatus for transferring refuse from the trough to the compartment comprising a sweep panel rotatable in one direction through a substantially complete revolution through said trough to move refuse from the trough to a supported position on said sweep panel, and a ram panel mounted above said sweep panel for movement across said sweep panel in one direction for moving refuse from the sweep panel into the compartment; a pair of cam members connected to said sweep panel for rotation therewith, separate motor means for moving said panels, and means connected to said motor means and operatively associated with said cams for selectively controlling the operation of said motor means so that said panels are moved through a predetermined cycle in response to movement of said sweep panel.

2. In a refuse collector having a storage compartment, a refuse receiving trough positioned adjacent said compartment, a pair of refuse handling members movable from start positions through a predetermined cycle for transferring refuse from the trough to the compartment and wherein one of said handling members is mounted for substantially full circle rotation through said trough; first motor means for moving one of said handling members, second motor means for moving the other one of said handling members, a first control unit for said first motor means, a second control unit for said second motor means, and means carried by said one of said handling members and operatively associated with said control units for actuating said control units to automatically provide for said predetermined cycle and to return said handling members to positions corresponding substantially to said start positions.

3. In a refuse collector having a storage compartment adapted to receive a number of charges of refuse, a tailgate structure into which refuse is adapted to be dumped prior to being transferred one charge at a time to the storage compartment, means supporting said tailgate at a position adjacent said compartment, a first refuse handling member mounted on said tailgate for movement therethrough so that upon each charging operation said member acts to sweep all of the refuse in the bottom of the tailgate into a relatively elevated position temporarily supported on said first member, and a second refuse handling member located above said first member and movable between a retracted position and a moved position to move the refuse on said first member into said storage compartment; motor means for operating said handling members, cam means connected to said first member and operatively associated with said motor means for actuating said motor means in accordance with the position of said first member until said first member is moved to said elevated position, means associated with said cam means providing for actuation of said motor means to move said second handling member toward said moved position therefor in response to movement of said first member to said elevated position, and means for operating said motor means in response to a final portion of the movement of said second handling member so that said first handling member is advanced from said elevated position to a latch position in the path of movement of said second member toward said retracted position.

4. In a refuse collector which includes a loading trough, a storage compartment, and means for transferring refuse from the trough to the storage compartment, a pair of co-axial rigidly connected cam members rotatable in response to operation of said transfer means, motor means for operating said transfer means, cam followers corresponding to said cam members, link means operatively associated with and extending between said motor means and said cam followers for actuating said motor means in response to the position of said followers on said cam members, a mounting plate positioned adjacent said cam members, a pair of manual control handles corresponding to said cam members and pivotally mounted on said mounting plate for pivotal movement in planes substantially parallel to said cam members, a pair of actuating levers connected to said handles and said link means to provide for manual actuation of the motor means in response to actuation of said handles, a pair of plate members corresponding to and arranged in a supporting relation with said cam followers and means releasably locking each of said supporting plates to a corresponding actuating lever for unison movement therewith and for release therefrom so that said levers are movable independently of said cam followers.

5. In a refuse collector having a storage compartment provided with a feeding opening in one side and adapted to receive a number of charges of refuse, a stationary receiving trough into which refuse is adapted to be dumped prior to being transferred to the storage compartment, and a pair of movable refuse handling members, one of which members is located in the trough and upon each charging operation is rotatable through a substantially complete revolution and acts to sweep all of the refuse in the bottom of the trough from the surface of the latter into a relatively elevated position in substantially horizontal alignment with said opening, in which elevated position said charge of refuse is temporarily supported on the surface of said first mentioned member, and the other of which members is located above the trough and is movable in one direction to move the refuse on said first mentioned member through said opening and into said storage compartment; fluid motor means for operating said refuse handling members, coacting cam and cam follower means associated with said one member and said fluid motor means for providing an automatic actuation of said fluid motor means in accordance with the position of said one member and means for manually initiating operation of said fluid motor means.

6. In a refuse collector which includes a storage compartment for receiving refuse, a refuse receiving trough positioned adjacent one side of said compartment, a sweep panel mounted for rotation in one direction through said trough through a complete circle from a substantially horizontal start position extending toward said compartment to move refuse from the trough to a supported position on said sweep panel, and a ram panel mounted above said sweep panel for movement across said sweep panel in one direction for moving refuse from the sweep panel into the compartment, said ram panel being movable in said one direction to a refuse compressing and start position in which the lower end of the ram panel is forwardly of said sweep panel and in the opposite direction to a retracted position from which it is movable in said one direction; panel control cam means carried by said sweep panel, separate fluid motor means for operating said panels, a pair of control valves corresponding to said motor means and means connected to said control valves and operatively associated with said cam means for controlling the operation of said motor means so that said panels are moved through a predetermined substantially complete cycle in which said panels are returned to substantially said start positions in response to movement of said sweep panel.

7. In a refuse collector which includes a storage compartment for receiving refuse, a refuse receiving tailgate structure positioned adjacent one side of said compartment, apparatus for transferring refuse from said tailgate to the compartment comprising a sweep panel, shaft means mounting said sweep panel on said tailgate for substantially full circle rotation in one direction to move refuse from the tailgate to a supported position on said sweep panel, and a ram panel mounted above said sweep panel for movement across said sweep panel in one direction for moving refuse from the sweep panel into the compartment; a pair of cam members rigidly mounted on said sweep panel shaft means for rotation therewith, separate fluid motor means for operating said panels, a pair of control valves corresponding to said motor means, a pair of cam followers corresponding to said cams, and linkage means connected to and extending between said cam followers and said control valves for controlling the operation of said motor means so that said panels are moved through a predetermined cycle in response to movement of said sweep panel.

8. In a refuse collector having a storage compartment for receiving a number of charges of refuse, a stationary refuse receiving trough positioned adjacent said compartment and having a capacity for a single charge, a pair of movable refuse handling members, one of which is arranged for substantially full circle rotation through said trough for moving the refuse therein to a supported position in which the refuse is movable into said compartment and the other of which is movable toward said compartment and across said first member for moving refuse off said first member and into said compartment; means for automatically controlling the movement of said members through a predetermined cycle in which said one member is movable to said position followed by movement of said other member across said one member comprising a fluid motor for rotating said one member, hydraulic means for moving said other member, valve means for selectively controlling the operation of said fluid and said hydraulic means, and motor means for automatically actuating said valve means to provide for an operation of said fluid motor and said hydraulic means which in turn provides for a movement of said handling members to charge said compartment.

9. In a refuse collector which includes a storage compartment for receiving refuse, a refuse receiving trough positioned adjacent one side of said compartment, a sweep panel mounted for rotation in one direction through said trough through a substantially complete circle from a substantially horizontal start position extending toward said compartment to move refuse from the trough to a supported position on said sweep panel, and a ram panel mounted above said sweep panel for movement across the sweep panel in one direction for moving refuse from the sweep panel into the compartment and in the opposite direction to a retracted position from which it is movable in said one direction; motor means for moving said panels, a pair of cam members corresponding to said panels and secured to said sweep panel for rotation therewith, each of said cam members being shaped to define a cycle of movement for its corresponding panel, and means including said cam members for operating said motor means so that said panels are moved through a predetermined substantially complete cycle in which said panels are returned to substantially said start positions.

10. In a refuse collector having a storage compartment adapted to receive a number of charges of refuse, a loading trough adjacent said compartment, a first refuse handling member mounted for rotation through a complete revolution and through said trough so that upon each charging operation said member sweeps the refuse in said trough into a relatively elevated position temporarily supported on said first member, and a second refuse handling member located above said first member and mounted for rotation from a retracted position in a direction in which the lower end thereof moves toward said compartment and across said first member to push refuse on said first member into said storage compartment, said second member being rotatable in said one direction to a final position in which the lower end thereof is spaced horizontally from said first member so that the second member does not block further rotation of the first member in said one direction; motor means for moving said handling members, cam means connected to said first member and coacting cam follower means operatively associated with said motor means for operating said motor means to rotate said first member in one direction to said elevated position and thereafter to move said second member from said retracted position to said final position, a motor means control member, a movable cam member mounted so that on movement in one direction it engages said control member and actuates the control member to provide for further rotation of said first member in said one direction, and means connected to said second handling member and to said cam member for moving said cam member during the final portion of the movement of said second handling member toward said final position therefor and after the lower end of said second member has been moved to a position out of the path of movement of said first member during further rotation thereof.

11. In a refuse collector having a storage compartment, a refuse receiving trough positioned adjacent said compartment, a pair of refuse handling members movable from start positions through a predetermined cycle for transferring refuse from the trough to the compartment and wherein one of said handling members is mounted for substantially full circle rotation through said trough; first motor means for moving one of said handling members, second motor means for moving the other one of said handling members, a first control unit for said first motor means, a second control unit for said second motor means, means connected to said one of said handling members and operatively associated with said control units for actuating said control units to automatically provide for said predetermined cycle and to return said handling members to positions corresponding substantially to said start positions, and means for actuating the one of said control units corresponding to said one handling member to initiate movement thereof through said cycle.

References Cited in the file of this patent
UNITED STATES PATENTS

| | | |
|---|---|---|
| 1,931,071 | Halstead | Oct. 17, 1933 |
| 2,335,155 | Lee | Nov. 23, 1943 |
| 2,703,184 | Barrett | Mar. 1, 1955 |
| 2,730,255 | Gibson et al. | Jan. 10, 1956 |
| 2,748,964 | Murphy | June 5, 1956 |
| 2,798,624 | Brown et al. | July 9, 1957 |
| 2,807,377 | Pellat-Finet | Sept. 24, 1957 |
| 2,813,641 | Starr | Nov. 19, 1957 |

UNITED STATES PATENT OFFICE
CERTIFICATE OF CORRECTION

Patent No. 2,975,913                                      March 21, 1961

Joseph M. Gwinn, Jr., et al.

It is hereby certified that error appears in the above numbered patent requiring correction and that the said Letters Patent should read as corrected below.

Column 3, line 70, for "plate" read -- plates --; column 5, line 9, for "spring" read -- springs --; column 10, line 25, after "fluid" insert -- motor --; line 26, strike out -- motor --.

Signed and sealed this 21st day of November 1961.

(SEAL)
Attest:

ERNEST W. SWIDER                                                DAVID L. LADD
Attesting Officer                                                Commissioner of Patents

USCOMM-DC